United States Patent
Ueda

(10) Patent No.: US 9,846,558 B2
(45) Date of Patent: Dec. 19, 2017

(54) INFORMATION PROCESSING DEVICE, METHOD, AND INFORMATION PROCESSING SYSTEM

(71) Applicant: Shigeo Ueda, Kanagawa (JP)

(72) Inventor: Shigeo Ueda, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/289,230

(22) Filed: Oct. 10, 2016

(65) Prior Publication Data

US 2017/0109105 A1    Apr. 20, 2017

(30) Foreign Application Priority Data

Oct. 19, 2015 (JP) ................................. 2015-205687
May 18, 2016 (JP) ................................. 2016-099304

(51) Int. Cl.
*G06F 15/00* (2006.01)
*G06F 3/12* (2006.01)
*H04N 1/00* (2006.01)

(52) U.S. Cl.
CPC .......... *G06F 3/1221* (2013.01); *G06F 3/1229* (2013.01); *G06F 3/1236* (2013.01); *G06F 3/1286* (2013.01); *H04N 1/00891* (2013.01); *H04N 2201/0094* (2013.01)

(58) Field of Classification Search
CPC .... G06F 3/1221; G06F 3/1236; G06F 3/1229; G06F 3/1286; H04N 1/00891; H04N 2201/0094
See application file for complete search history.

(56) References Cited

U.S. PATENT DOCUMENTS

| 7,755,779 B2* | 7/2010 | Miura ................ H04N 1/00209 358/1.13 |
| 2013/0212418 A1 | 8/2013 | Ueda |
| 2014/0363186 A1* | 12/2014 | Otsuka .................. G06F 3/1221 399/75 |
| 2015/0185818 A1 | 7/2015 | Ueda |

FOREIGN PATENT DOCUMENTS

JP    2010-160550    7/2010

* cited by examiner

*Primary Examiner* — Saeid Ebrahimi Dehkord
(74) *Attorney, Agent, or Firm* — Oblon, McClelland, Maier & Neustadt, L.L.P.

(57) ABSTRACT

An information processing device connected to a terminal via a network includes a memory that stores inquiry packet data received from the terminal in association with response packet data to respond to the inquiry packet data; control circuitry to control an operation mode of the information processing device, wherein when the information processing device is in an energy conservation mode, the control circuitry determines whether or not the received inquiry packet data is new inquiry packet data determined by new network protocols, when the received inquiry packet data is the new inquiry packet data, the control circuitry reinstates the information processing device, in conjunction with a transmission for the response packet data generated by the information processing device to the terminal, and stores the received inquiry packet data and the generated response packet data to the memory.

17 Claims, 8 Drawing Sheets

FIG. 6

MODIFICATION 1

28

| INQUIRY PACKET DATA | RESPONSE PACKET DATA | RESPONSE NUMBER |
|---|---|---|
| R (8) | RD (8) | 1000 |
| R (7) | RD (7) | 1500 |
| R (6) | RD (6) | 20 |
| R (5) | RD (5) | 500 |
| R (4) | RD (4) | 700 |
| R (3) | RD (3) | 1000 |
| R (2) | RD (2) | 400 |
| R (1) | RD (1) | 2000 |

WHOLE MEMORY AMOUNT

DISCARD THE OLD INQUIRY PACKET DATA AND THE RESPONSE PACKET DATA

STORE THE NEW INQUIRY PACKET DATA AND THE RESPONSE PACKET DATA

FIG. 7

MODIFICATION 2

28

| INQUIRY PACKET DATA | RESPONSE PACKET DATA | INTERVAL OF RECEIVE TIME (sec) |
|---|---|---|
| R (8) | RD (8) | 10 |
| R (7) | RD (7) | 600 |
| R (6) | RD (6) | 1500 |
| R (5) | RD (5) | 2000 |
| R (4) | RD (4) | 3600 |
| R (3) | RD (3) | 2000 |
| R (2) | RD (2) | 100 |
| R (1) | RD (1) | 500 |

WHOLE MEMORY AMOUNT

DISCARD THE OLD INQUIRY PACKET DATA AND THE RESPONSE PACKET DATA

STORE THE NEW INQUIRY PACKET DATA AND THE RESPONSE PACKET DATA

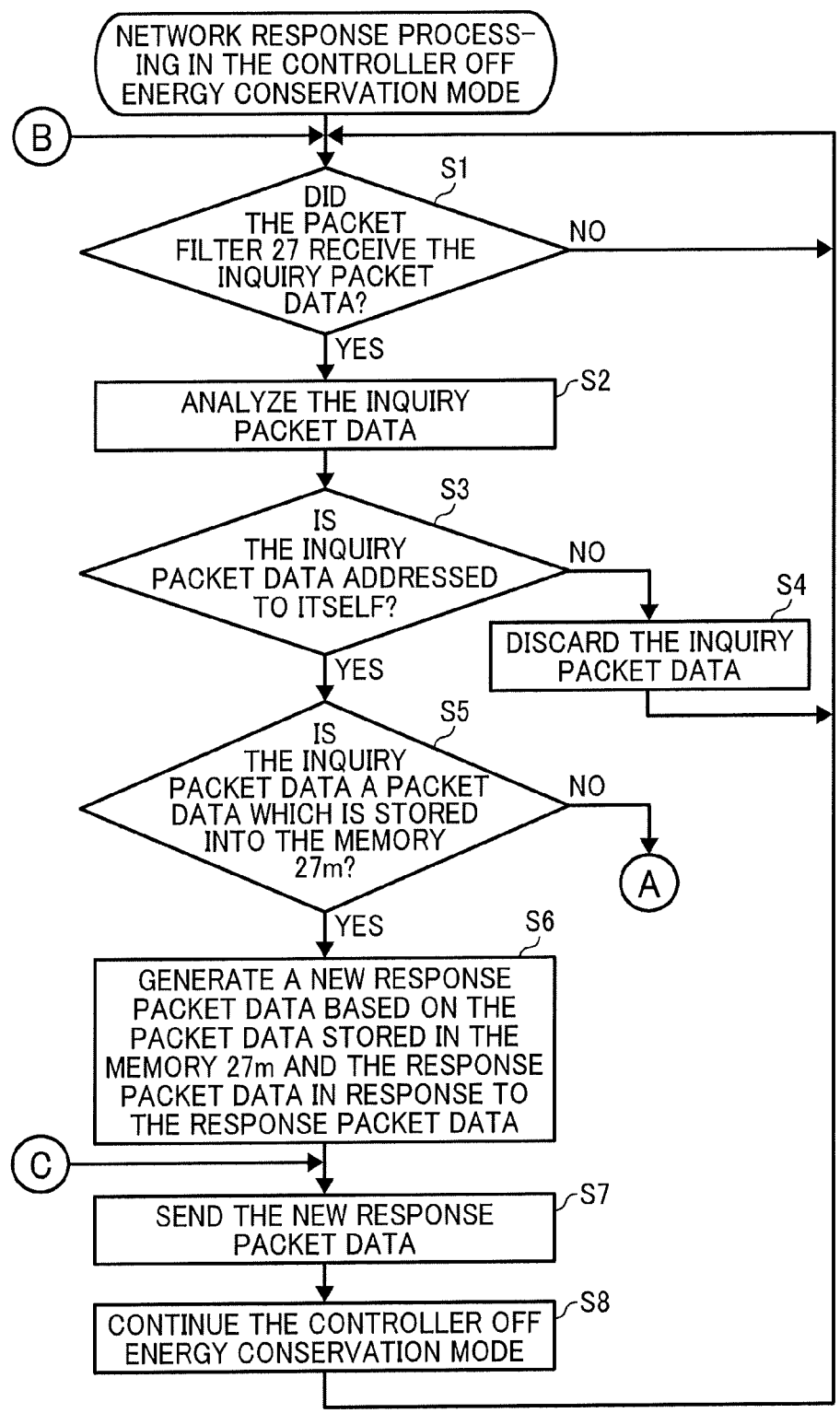

INFORMATION PROCESSING DEVICE, METHOD, AND INFORMATION PROCESSING SYSTEM

CROSS REFERENCE TO RELATED APPLICATIONS

The present application is based upon and claims the benefit of priority from Japanese Application Nos. 2015-205687, filed Oct. 19, 2015, and 2016-099304, filed May 18, 2016, the entire contents of which are incorporated herein by reference.

BACKGROUND

1. Field

The present disclosure relates to an information processing device, a method, and an information processing system.

2. Description of the Related Art

In a known information processing system, an information processing device such as a printer or a Multi-Function Peripheral (MFP) is connected to a network such as a Local Area Network (LAN), which is connected to a client terminal device. The client terminal device can be, e.g., a personal computer (PC), a tablet type terminal, or a mobile phone. This kind of information processing device, for a purpose of reducing the power consumption, has an energy conservation mode that disconnects electric power to a circuit or a CPU when not being used in a waiting mode, for example, or slows down a processing speed of the CPU to save power.

This kind of information processing device can receive a status inquiry status from the client terminal device even in the energy conservation mode. For this reason, it is known that such an information processing device can have a sub-controller separate from a main controller. The sub-controller has predetermined response data for response to the status inquiry when in the energy conservation mode. Thus, the information processing device can respond to the status inquiry from the client terminal device and maintain the energy conservation mode using the sub-controller, even in the energy conservation mode, which stops electric power supply to the main controller. For example, refer to Japanese Laid-Open Patent Publication No. JP2010-160550.

When a client terminal device equipped with a new operating system (OS) is connected on a network, to maintain the energy conservation mode with respect to the inquiry data for a new network protocol to be used in the new OS, there is a need to incorporate appropriate response data into the sub-controller.

Therefore, this disclosure, in considering the circumstances described above, provides an information processing device without a need to incorporate the response data with respect to the inquiry data for a new network protocol in the energy conservation mode.

SUMMARY

According to one embodiment, there is provided a memory that stores inquiry packet data received from the terminal in association with response packet data to respond to the inquiry packet data; control circuitry configured to control an operation mode of the information processing device, wherein when the information processing device is in an energy conservation mode, the control circuitry is configured to determine whether or not the received inquiry packet data is new inquiry packet data determined by new network protocols, when the received inquiry packet data is the new inquiry packet data, the control circuitry is configured to reinstate the information processing device, in conjunction with a transmission for the response packet data generated by the information processing device to the terminal, and store the received inquiry packet data and the generated response packet data to the memory, and when the received inquiry packet data is not the new inquiry packet data, the control circuitry is configured to generate new response packet data based on the response packet data stored in the memory, and transmit the new response packet data to the terminal.

According to the present disclosure, in the energy conservation mode, it is possible to provide an information processing device without a need to incorporate the response data with respect to the inquiry data for a new network protocol.

BRIEF DESCRIPTION OF THE DRAWINGS

FIG. 6 is a memory map that indicates a structure of a storage area of a packet memory 28 related to a first modification of FIG. 5 according to one embodiment;

FIG. 7 is a memory map that indicates a structure of a storage area of a packet memory 28 related to a second modification of FIG. 5 according to one embodiment;

FIG. 8A is a flowchart of a first part of network response processing in a controller-off mode of the information processing device 1 shown in FIG. 1 according to one embodiment;

DETAILED DESCRIPTION OF THE PREFERRED EMBODIMENTS

Figure 1:
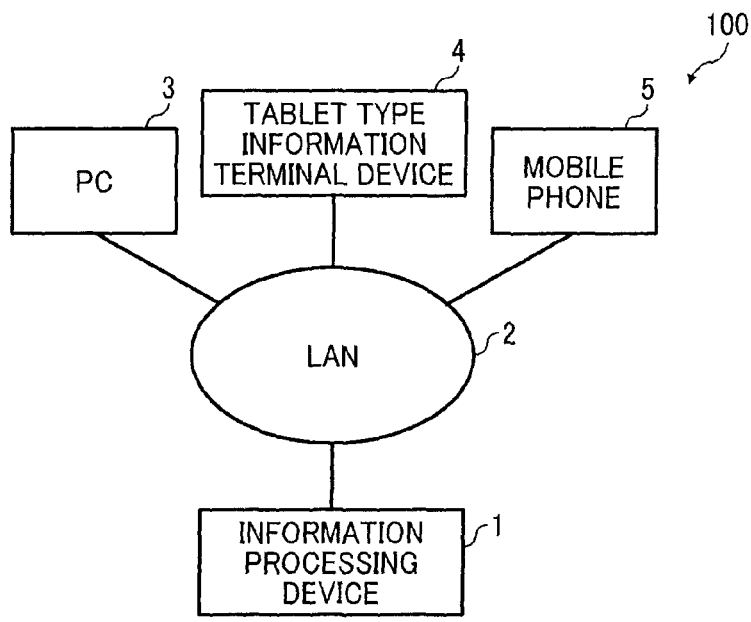
FIG. 1 is a block diagram of an information processing system 100 according to one embodiment.

The characteristics of the present disclosure are explained in detail using the drawings. In the present disclosure, the same reference numerals are used for the same parts in each drawing.

In the present embodiment, FIG. 1 is a block diagram that indicates a hardware structure of the information processing system 100 according to one embodiment. As shown in FIG. 1, the information processing system 100 has an information processing device 1, a LAN 2, a PC 3, a tablet-type information terminal 4, and a mobile phone 5.

The information processing apparatus 1 is connected with a client terminal device, such as the PC 3, the tablet-type information terminal 4, and the mobile phone 5, etc. via the LAN 2. For example, the information processing apparatus 1 is a Multi-Function Peripheral (MFP) that has a printer function, a scanner function, and a copier function. The information processing apparatus 1 receives print-specified packet data via the PC 3, the tablet-type information terminal 4, and the mobile phone 5, etc. via the LAN 2, and performs printing based on the packet data. Also, the information processing apparatus 1 receives inquiry packet data related to status information that indicates the printer status via the PC 3, the tablet-type information terminal 4, and the mobile phone 5, etc. via the LAN 2, and replies with response packet data related to the status information. It should be noted that, although in the following description, the PC 3 is used in the description, it is possible to replace the PC 3 with the tablet-type information terminal 4 or the mobile phone 5 in the following description.

Figure 2:
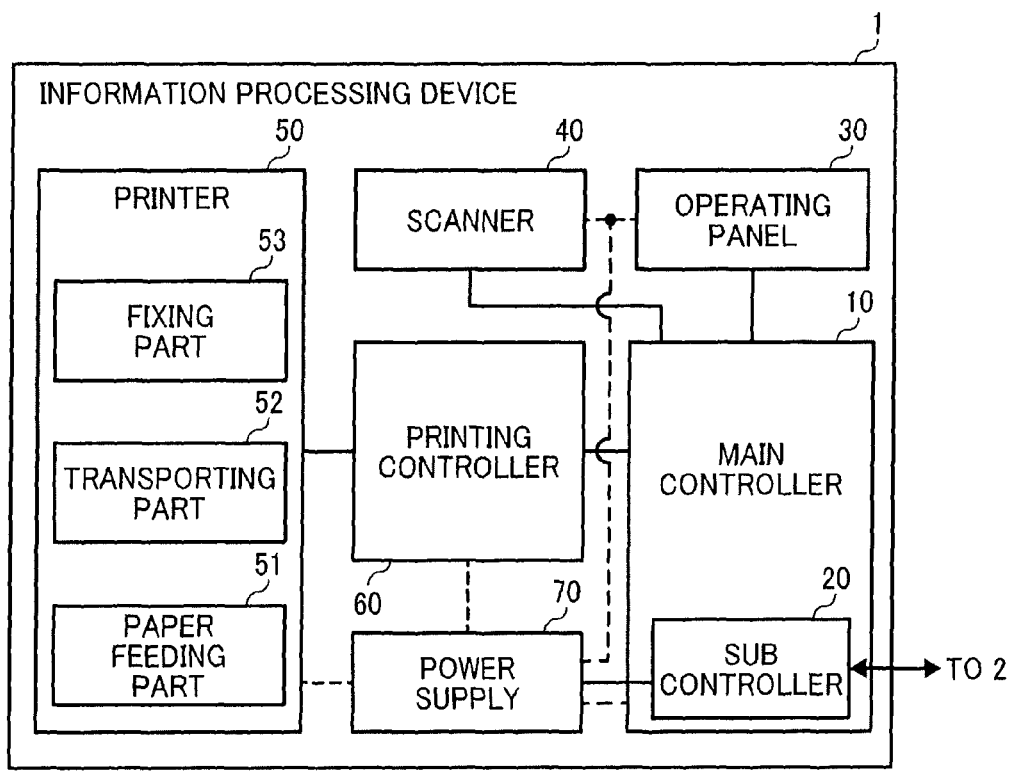
FIG. 2 is a block diagram of an information processing device 1 shown in FIG. 1 according to one embodiment.

FIG. 2 is a block diagram of the information processing device 1 shown in FIG. 1. As shown in FIG. 2, the information processing device 1 has a main controller 10, an operating panel 30, a scanner 40, a printer 50, a printing controller 60, and a power supply 70. It should be noted that, as shown in FIG. 2, the solid lines connecting the respective parts indicate data transmission lines, and the dotted lines connecting each part represent electrical power supply lines.

As shown in FIG. 2, for example, the operating panel 30 includes a keyboard for operation by a user, and transmits an operating signal based on an operation of operating buttons on the keyboard. The scanner 40 generates image data based on a manuscript paper, and transmits the image data to the main controller 10. The printer 50 forms the image data on printing paper based on the image data received via the printing controller from the main controller. The printer 50 includes a paper feeding part 51, a transporting part 52, and a fixing part 53. The paper feeding part 51 has a paper feeding cassette, and supplies the paper stored in the feeding cassette to the transporting part 52. The transporting part 52 has a transporting roller and transports the printing paper, which is supplied from the paper feeding part 51, to the fixing part 53. The fixing part 53 fixes toner or ink, etc. to the printing paper, which is transported by the transporting part 52. The printing controller 60 transmits the image data supplied from the main controller 10 to the printer 50, and controls an operation of the printer 50. The power supply 70 includes an electric power conversion circuit, and, for example, translates commercial AC power to DC power. The power supply 70 also supplies the translated DC power to the main controller, the operating panel 30, the scanner 40, the printer 50, and the printer controller 60.

The main controller 10 controls the entire information processing device 1. The main controller 10 controls the scanner 40, the printer 50, and the printing controller 60 based on the operating signal from the operating panel 30. Also, the main controller 10 performs predetermined image processing based on the image data from the scanner 40, and stores temporarily the image data to a memory. After that, the main controller 10 transmits the image data stored in the memory to the PC 3. Further, the main controller 10 receives a print job from the PC 3 via the LAN 2 and the sub controller 20, and controls the printing controller 60 based on the received print job. Also, the main controller 10 receives inquiry packet data related to status information via the LAN 2 and the sub-controller 20 from the PC 3, and generates the response packet data related to the status information. The main controller 10 transmits the generated response packet data to the PC 3 via the sub controller 20 and the LAN 2.

Figure 3:
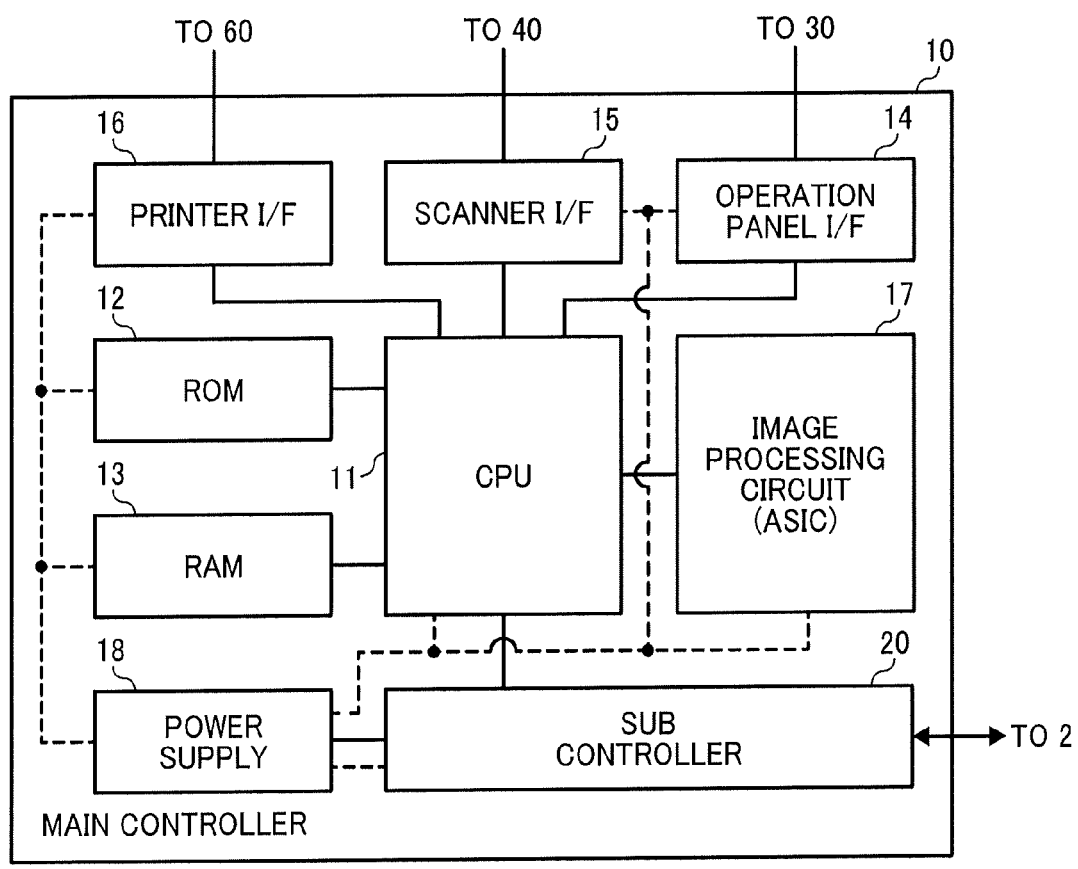
FIG. 3 is a block diagram of a main controller 10 shown in FIG. 2 according to one embodiment.

FIG. 3 is a block diagram of the main controller 10 shown in FIG. 2. In FIG. 3, the main controller 10 includes a ROM (Read Only Memory) 12 and a RAM (Random Access Memory) 13. In addition, the main controller 10 has an operating panel interface 14, a scanner interface 15, a printer interface 16, an image processing circuit (ASIC) 17, a power supply circuit 18, and a sub controller 20. It should be noted that, in FIG. 3, the solid lines connecting the respective parts indicate data transmission lines, and the dotted lines connecting each unit indicate electrical power supply lines.

In FIG. 3, the CPU 11 performs control of the entire main controller 10 by executing the program stored in the ROM 12. It should be noted that the CPU 11 uses the RAM 13 as a work space when the CPU 11 executes the program. The CPU 11 receives an operating signal from the operating panel 30 via the operating panel I/F 40, and controls a scanning operation and a printing operation in response to the operating signal. In addition, the CPU 11 receives image data from the scanner 40 via the scanner I/F 15, and transfers the image data to the image processing circuit 17. Further, the CPU 11 receives a print job from the PC3 via the LAN 2 and the sub controller 20, and transfers the print job to the image processing circuit 17. Moreover, the CPU 11 receives image data from the image processing circuit 17, and transfers the image data to the printer controller 60 via the printer I/F 16. The CPU 11 also receives inquiry packet data related to the status information from the PC 3 via the LAN 2 and the sub controller 20, and generates response packet data related to the status information. The CPU 11 transmits the generated response packet data to the PC3 via the sub controller 20 and the LAN 2.

The image processing circuit 17, for example, can be an ASIC (Application Specific Integrated Circuit). The image processing circuit receives image data from the scanner 40 via the scanner I/F and the CPU 11. Also, the image processing circuit receives a print job from the PC 3 via the LAN 2, the sub controller 20, and the CPU 11, and performs image processing on the image data and the print job.

The power supply circuit 18 supplies electric power to the entire main controller 10 based on the electric power supplied from the power supply 70. That is, the power supply circuit 18 supplies the electrical power to the CPU 11, the ROM 12, the RAM 13, the operating panel I/F 14, the scanner I/F 15, the printer I/F 16, the image processing circuit 17, and the sub controller 20.

Figure 9:
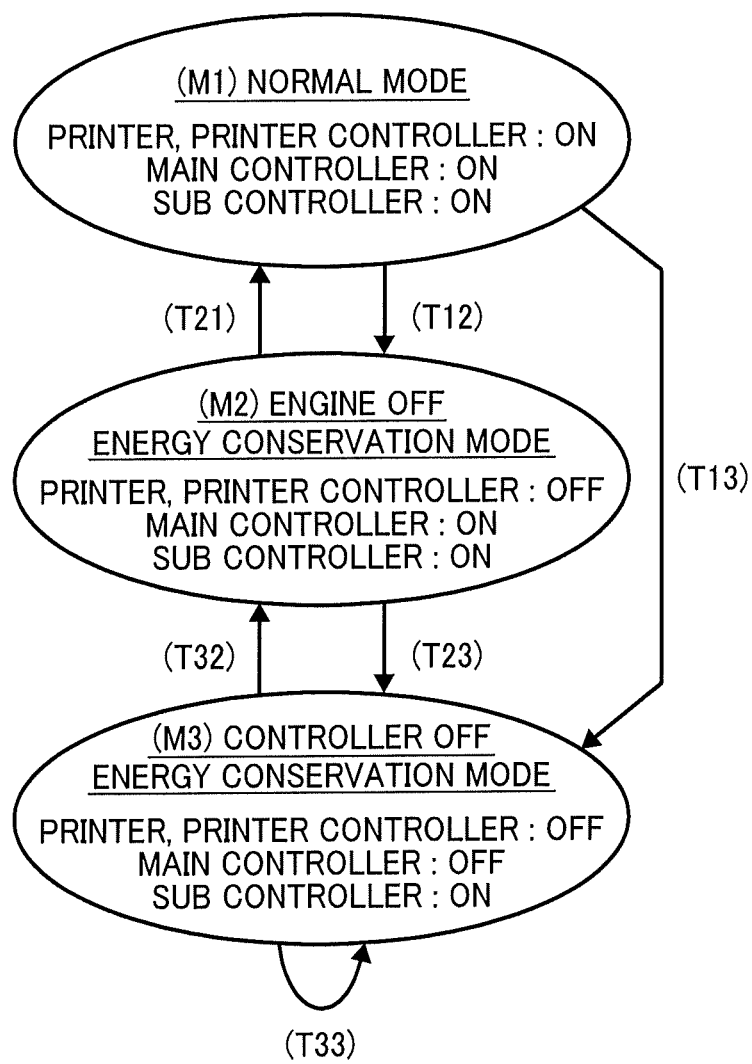
FIG. 9 is a state transition diagram among the operation modes shown in FIG. 1 according to one embodiment.

The sub controller 20 controls communication between the information processing device 1 and the PC 3 via the LAN 2. Also, the sub controller 20 controls operation modes of the information processing device, including a normal mode, an engine-off-energy-conservation mode, and a controller-off-energy-conservation mode. The sub controller 20 controls the electric power supply from the power supply 70 and the power supply circuit 18 to each part of the information processing device. Hereinafter, the operation modes of the information processing apparatus 1 will be described with reference to the state transition diagram between operating modes of the information processing apparatus 1 shown in FIG. 9.

(M1)—The Normal Mode

The normal mode (M1) is an operation mode that supplies the electrical power to the entire information processing device 1. That is, the normal mode is a mode in which electrical power is supplied to the main controller 10, the sub controller 20, the operating panel 30, the scanner 40, the printer 50, and the printer controller 60. By this, in the normal mode (M1), the main controller 10, the sub controller 20, the operating panel 30, the scanner 40, the printer 50, and the printer controller 60 will be capable of operating.

(M2) The engine-Off-Energy-Conservation Mode

The engine-off-energy-conservation mode (M2) is an operation mode in which electrical power is supplied to the main controller 10 and the sub controller 20, but not to the operating panel 30, the scanner 40, the printer 50, and the printer controller 60. Thus, in the engine-off-energy-conservation mode (M2), the operating panel 30, the scanner 40, the printer 50, and the printer controller 60 will be incapable of operating, but the main controller 10 and the sub controller 20 will be capable of operating. In the engine-off-energy-conservation mode (M2), the information processing device 1 will be able to respond to various inquiries from the PC 3, and will be able to perform a process of editing of the image data, etc. For that reason, the information processing device 1 will be able to reduce the energy consumption compared to the normal mode (M1).

(M3) The Controller-Off-Energy-Conservation Mode

The controller-off-energy-conservation mode (M3) is an operation mode in which electrical power is supplied to the sub controller 20, but not to the main controller 10, the operating panel 30, the scanner 40, the printer 50, and the printer controller 60. Thus, in the controller-off-energy-conservation mode (M3), the main controller 10, the operating panel 30, the scanner 40, the printer 50, and the printer controller 60 will be incapable of operating, but the sub controller 20 will be capable of operating. In the controller-off-energy-conservation mode (M3), the information processing device 1 will be able to respond to some of the inquiries from the PC 3, which, as described below, is mainly carried out by the packet filter 27 and the packet comparison circuit 29.

Further, the sub controller 20 generates the response packet data when the main controller 10 receives the inquiry packet data from the PC 3 via the LAN 2 in the controller-off-energy-conservation mode (M3). In particular, the sub controller 20 generates the response packet data related to the status information and transmits it to the PC 3 via the LAN 2, when the sub controller 20 receives the inquiry packet data related to a part of the status information.

Figure 4:
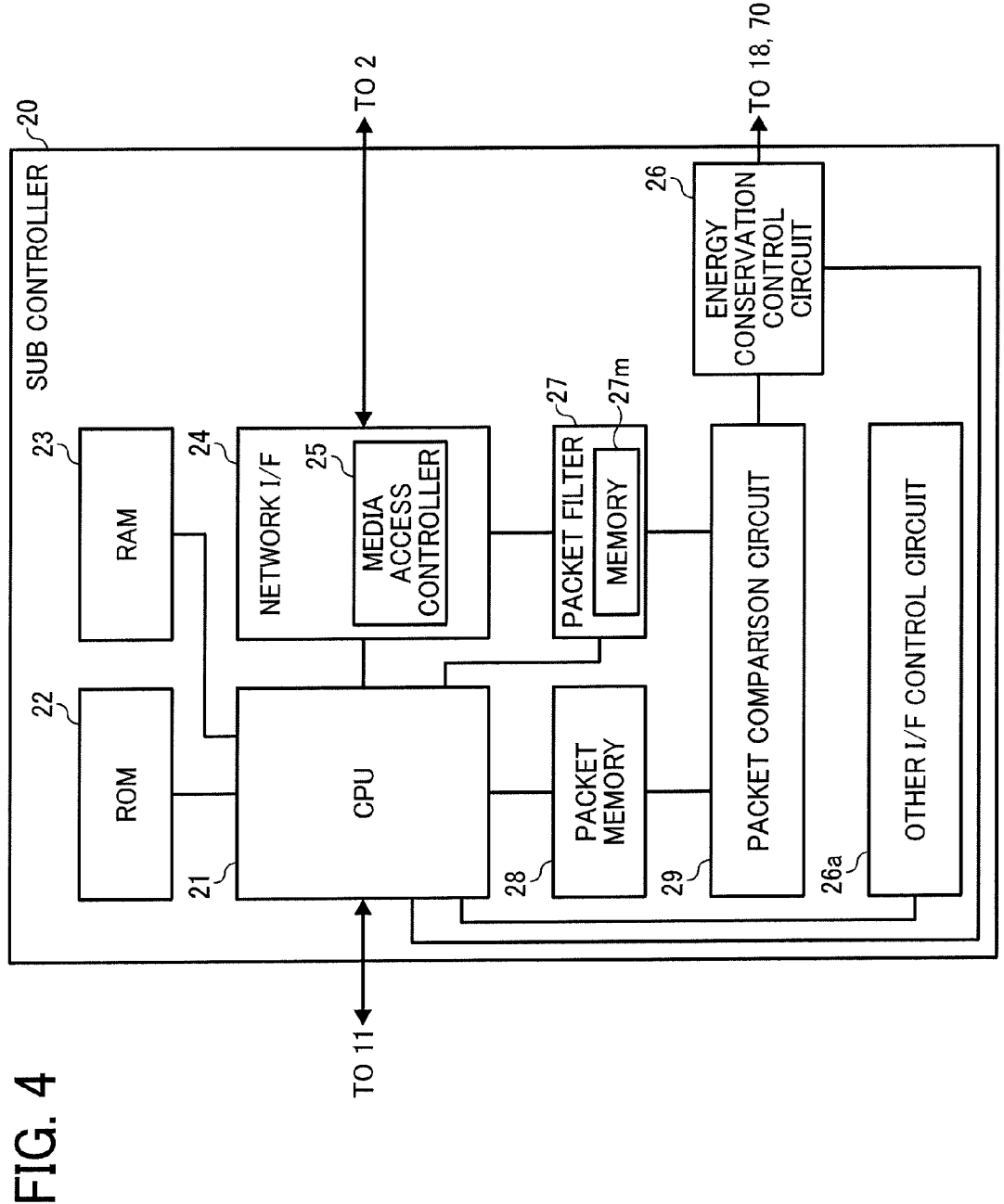
FIG. 4 is a block diagram of a sub controller 20 shown in FIG. 3 according to one embodiment.

FIG. 4 is a block diagram that indicates the sub controller 20 of FIG. 3. In FIG. 4, the sub controller 20, as an example of a control circuit, has a CPU 21, a ROM 22, a RAM 23, a network I/F 24, an energy conservation control circuit 26, and the other interface control circuit 26a. The sub controller 20 also includes packet filter 27, a memory 27m, a packet memory 28 as an example of a memory, and a packet comparison circuit 29.

In FIG. 4, the CPU 21 performs control of the entire main controller 10 by executing the program stored in the ROM 22, which is one example of a non-transitory computer-readable medium. It should be noted that the CPU 21 uses the RAM 23 as a work space when the CPU 21 executes the program. The CPU 21 receives print specified packet data and inquiry packet data related to the status information from the PC 3 via the LAN 2 and the network I/F 24, and transfers it to the CPU 11. Also, the CPU 21 receives response packet data related to the status information from the CPU 11, and transfers the response packet data to the PC 3 via the network I/F 24 and the LAN 2. Also, the CPU 21 transmits a migration request signal for the engine-off-energy-conservation mode (M2) to the energy conservation control circuit 26 when the CPU 21 does not receive the print specified packet data for a certain period of time. Further, the CPU 21 transmits a migration request signal for the engine-off-energy-conservation mode (M2) to the energy conservation control circuit 26 when the CPU 21 does not receive the inquiry packet data related to the status information for a certain period of time in addition to the print specified packet data. Also, the CPU 21 transmits a migration request signal for the controller-off-energy-conservation mode (M3) to the energy conservation control circuit 26 when the migration to the controller-off-energy-conservation mode (M3) is performed forcibly by the user operation on the operating panel 30. Further, the CPU 21 transmits a return request signal to the normal mode (M1) to the energy conservation control circuit 26, when the CPU 21 does not receive print specified packet data for a certain period of time, and then receives the print specified packet data.

The network I/F 24 includes a media access controller 25 and controls transmitting/receiving of the packet data. The network I/F 24 transfers the inquiry packet data to the CPU 21, which was received from the PC 3 via the LAN 2 in the normal mode (M1) and the engine-off-energy-conservation mode (M2). On the other hand, the network I/F 24 transfers the received inquiry packet data to the packet filter 27 in the controller-off-energy-conservation mode (M3). Further, the network I/F 24 transfers the response packet data from the CPU 21 to the PC 3 via the LAN 2 in the normal mode (M1) and the engine-off-energy-conservation mode (M2). On the other hand, the network I/F transmits the response packet data from the packet filter 27 to the PC 3 via the LAN 2 in the controller-off-energy-conservation mode (M3).

It should be noted that the sub controller 20 has the other interface (I/F) control circuit 26a for controlling interfaces except the network, such as a USB or a serial interface, etc.

The energy conservation control circuit 26 controls transactions among the normal mode (M1), the engine-off-energy-conservation mode (M2), and the controller-off-energy-conservation mode (M3) in response to the request signal from the CPU 21 and the packet comparison circuit 29.

(T12) The Transition from the Normal Mode (M1) to the Engine-Off-Energy Conservation Mode (M2)

The energy conservation control circuit 26 controls the transition from the normal mode (M1) to the engine-off-energy-conservation mode (M2) in response to the transition request signal for the engine-off-energy-conservation mode (M2) from the CPU 21. In other words, the energy conservation control circuit 26 controls transition from the normal mode (M1) to the engine-off-energy-conservation mode (M2) when the information processing device 1 receives only the packet data related to a various measurements and application behavior, etc. In this case, the energy conservation control circuit 26 can operate using only the main controller 10 without the printer 50 and the printer controller 60. Also, the energy conservation control circuit 26 controls the transition from the normal mode (M1) to the engine-off-energy-conservation mode (M2) in case of not using the printer 50 and the printer controller 60 for a certain period of time. In particular, the energy conservation control circuit 26 controls the power supply 70, and stops supplying electric power from the power supply 70 to the operating panel 30, the scanner 40, the printer 50, and the printer controller 60. It should be noted, however, that the energy conservation control circuit 26 continues to supply the electric power to the main controller 10 and the sub controller 20.

(T13) The Transition from the Normal Mode (M1) to the Controller-Off-Energy-Conservation Mode (M3)

The energy conservation control circuit 26 controls the transition from the normal mode (M1) to the controller-off-energy-conservation mode (M3) in response to the transition request signal for the controller-off-energy-conservation mode (M3) from the CPU 21. In other words, the energy conservation control circuit 26 controls transition from the normal mode (M1) to the controller-off-energy-conservation mode (M3) when the information processing device 1 does not receive the print specified packet data or the inquiry packet data related to status information. Further, the energy conservation control circuit 26 controls the transition from the normal mode (M1) to the controller-off-energy-conservation mode (M3) when the information processing device 1 is forced to transition into the controller-off-energy-saving mode (M3) by the user. In particular, the energy conservation control circuit 26 controls the power supply 70, and stops supplying electric power from the power supply 70 to the operating panel 30, the scanner 40, the printer 50, and the printer controller 60. In addition, the energy conservation control circuit 26 controls the power supply circuit 18, and stops supplying the electric power from the power supply circuit 18 to each part of the main controller 10. That is, the energy conservation control circuit 26 controls the power supply circuit 18, and stops supplying the electrical power from the power supply circuit 18 to the CPU 11, the ROM 12, the RAM 13, the operation panel I/F 14, the scanner I/F 15, the printer I/F 16, and the image processing circuit 17. It should be noted, however, that the energy conservation control circuit 26 continues to supplying the electric power to the sub controller 20.

(T23) The Transition from the Engine-Off-Energy Conservation Mode (M2) to the Controller-Off-Energy-Conservation Mode (M3)

The energy conservation control circuit 26 controls the transition from the engine-off-energy-conservation mode (M2) to the controller-off-energy-conservation mode (M3) in response to the transition request signal for the controller-off-energy-conservation mode (M3) from the CPU 21. In other words, the energy conservation control circuit 26 controls the transition from the engine-off-energy-conservation mode (M2) to the controller-off-energy-conservation mode (M3) when the information processing device 1 does not receive the inquiry packet data related to the status information for a certain period of time. Thus, the energy conservation control circuit 26 controls transition from the engine-off-energy-conservation mode (M2) to the controller-off-energy-conservation mode (M3) when the information processing device 1 does not use the main controller 10 for a certain period of time. In particular, the energy conservation control circuit 26 controls the power supply circuit 18, and stops supplying the electrical power from the power supply circuit 18 to each part of the main controller 10. That is, the energy conservation control circuit 26 stops supplying the electrical power from the power supply circuit 18 to the CPU 11, the ROM 12, the RAM 13, the operation panel I/F 14, the scanner I/F 15, the printer I/F 16, and the image processing circuit 17.

(T33) The Controller-Off-Energy-Conservation Mode (M3) Retention

When the sub controller 20 receives inquiry packet data determined by the expected known network protocols and is able to respond to the inquiry packet data, the energy conservation control circuit 26 does not receive a request signal from the CPU 21 and the packet comparison circuit 29. At this time, the energy conservation control circuit 26 retains control in the controller-off-energy-conservation mode (M3).

(T32) The Transition from the Controller-Off-Energy-Conservation Mode (M3) to the Engine-Off-Energy-Conservation Mode (M2)

The energy conservation control circuit 26 controls the transition from the controller-off-energy-conservation mode (M3) to the engine-off-energy-conservation mode (M2) in response to the return request signal transmitted from the packet comparison circuit 29 from the controller-off-energy-conservation mode (M3). In other words, the energy conservation control circuit 26 controls the transition from the controller-off-energy-conservation mode (M3) to the engine-off-energy-conservation mode (M2) when the information processing device 1 receives inquiry packet data determined by the unexpected new network protocols. Thus, the energy conservation control circuit 26 reinstates the main controller 10 when the sub controller 20 determines that it is necessary to respond by the main controller 10. In particular, the energy conservation control circuit 26 controls the power supply circuit 18, and resumes supplying the electrical power from the power supply circuit 18 to each part of the main controller 10. That is, the energy conservation control circuit 26 resumes supplying the electrical power from the power supply circuit 18 to the CPU 11, the ROM 12, the RAM 13, the operation panel I/F 14, the scanner I/F 15, the printer I/F 16, and the image processing circuit 17.

(T31) The Transition from the Engine-Off-Energy-Conservation Mode (M2) to the Normal Mode (M1)

The energy conservation control circuit 26 controls the transition from the engine-off-energy-conservation mode (M2) to the normal mode (M1) in response to the return request signal transmitted from the CPU 21. In other words, the energy conservation control circuit 26 controls the transition from the engine-off-energy-conservation mode (M2) to the normal mode (M1) when the information processing device 1 receives the print specified packet data or the inquiry packet data related to status information. In other words, the energy conservation control circuit 26 controls transition from the engine-off-energy-conservation mode (M2) to the normal mode (M1) when the main controller 10 determines that it is necessary to reinstate the printer 50 and the printer controller 60. In particular, the energy conservation control circuit 26 controls the power supply 70, and resumes supplying the electrical power from the power supply 70 to the operating panel 30, the scanner 40, the printer 50, and the printer controller 60.

Returning to FIG. 4, the structure of the packet filter 27 is described below. The packet filter 27 has a memory 27m that stores inquiry packet data of a part of the status information expected in the controller-off-energy-conservation mode (M3), which is inquiry packet data determined by the expected network protocols. Further, the memory 27m stores response packet data to respond to the inquiry packet data in association with the inquiry packet data on a one-to-one basis.

The packet filter 27 receives the inquiry packet data from the PC 3 via the LAN 3 and the network I/F 24 in the controller-off-energy-conservation mode (M3). The packet filter 27 analyzes the received packet data whether or not addressed to itself. In the analysis, the packet filter 27 compares the IP address included in the inquiry packet data with the IP address stored in the memory 27m. When these IP addresses are not consistent, the packet filter 27 discards the inquiry packet data and determines that the inquiry packet data is not the packet data addressed to itself. On the other hand, when these IP addresses are consistent with one another, the packet filter 27 determines that the inquiry packet data is packet data addressed to itself.

The packet filter 27 compares the inquiry packet data addressed to itself with the inquiry packet data stored in the memory 27m. When these packet data are consistent with each other, the packet filter 27 generates response packet data based on the response packet data associated with the inquiry packet data stored in the memory 27m. That is, the packet filter 27 generates the response packet data based on the response packet data stored in the memory 27m among the inquiry packet data addressed to itself, for expected inquiry packet data. Further, the packet filter 27 transmits the response packet data to the PC 3 via the LAN 2 and the network I/F 24. On the other hand, the packet filter transmits the inquiry packet data addressed to itself to the packet comparison circuit 29 when the inquiry packet data addressed to itself is not consistent with the inquiry packet data stored in the memory 27m.

The information processing device 1 can receive inquiry packet data that uses unexpected new network protocols. For example, if a new OS (operating system) is installed into the PC 3, the information processing device 1 receives packet data determined by newly added network protocols. Also, for example, if the new network protocols are to be added to network devices like a hub or a router. etc., the information processing device 1 receives the inquiry packet data determined by the newly added network protocols. In this way, when the new network protocols are added, the PC 3 or the network devices would like to request the registration information and status information of a device connected to the LAN 2 many times.

For that reason, the packet memory 28 stores a response to the inquiry packet data determined by this kind of unexpected new network protocols in association with the response packet data generated by the CPU 11 in a one-to-one correspondence. Also, the packet comparison circuit 29 compares the inquiry packet data from the packet filter 27 with the inquiry packet data stored in the packet memory 28 in the controller-off-energy-conservation mode (M3). In this case, the packet comparison circuit 29 analyzes the data read out from the packet memory 28 sequentially.

If the inquiry packet data is packet data determined by a new protocol not stored in the packet memory 28, the packet comparison circuit 29 controls transition from the controller-off-energy-conservation mode (M3) to the engine-off-energy-conservation mode (M2). In this case, the packet comparison circuit 29 transmits a return request signal from the controller-off-energy-conservation mode (M3) to the energy conservation control circuit 26. At this time, the energy conservation control circuit 26 resumes supplying the electrical power from the power supply circuit 18 to each part of the main controller 10, and reinstates the main controller 10 from the controller-off-energy-conservation mode (M3).

Further, the packet comparison circuit 29 transmits the inquiry packet data to the CPU 11 of the main controller 10 via the packet filter 27, the media access controller 25, and the CPU 21. At this time, the CPU 11 generates the response packet data, and transmits the response packet data to the PC 3 via the CPU 21, the network I/F 24, the LAN 2. Also, the packet comparison circuit 29 stores the inquiry packet data to the packet memory 28. At this time, the CPU 21 stores the response packet data into the packet memory 28 in association with the inquiry packet data stored into the packet memory 28 in a one-to-one correspondence.

On the other hand, the packet comparison circuit 29 notifies the CPU 21 via the packet filter 27, if the inquiry packet data from the packet filter 27 is the packet data determined by an expected known network protocols, which is stored in the packet memory 28. At this time, the CPU 21 generates the response packet data based on the response packet data stored in the packet memory 28, and transmits the response packet data to the PC 3 via the network I/F 24 and LAN 2.

It should be noted that, in terms of power consumption conservation based on the inquiry packet data determined by an unexpected new network protocol, it is desirable to increase the capacity of the packet memory 28. For example, it is desirable to increase the capacity of the packet memory 28 so that it can store a plurality of new inquiry packet data and associated response packet data. However, increasing the capacity of the packet memory 28 increases the cost and further increases the power consumption of the packet memory 28. Therefore, the capacity of the packet memory 28 must be determined in consideration of the power consumption reduction effect and the increase in cost. In the following, while suppressing an increase in the capacity of the packet memory 28, in order to obtain the effect of reducing the power consumption to maximize several methods (data handling) the packet data to be stored can be modified or exchanged.

Figure 5:
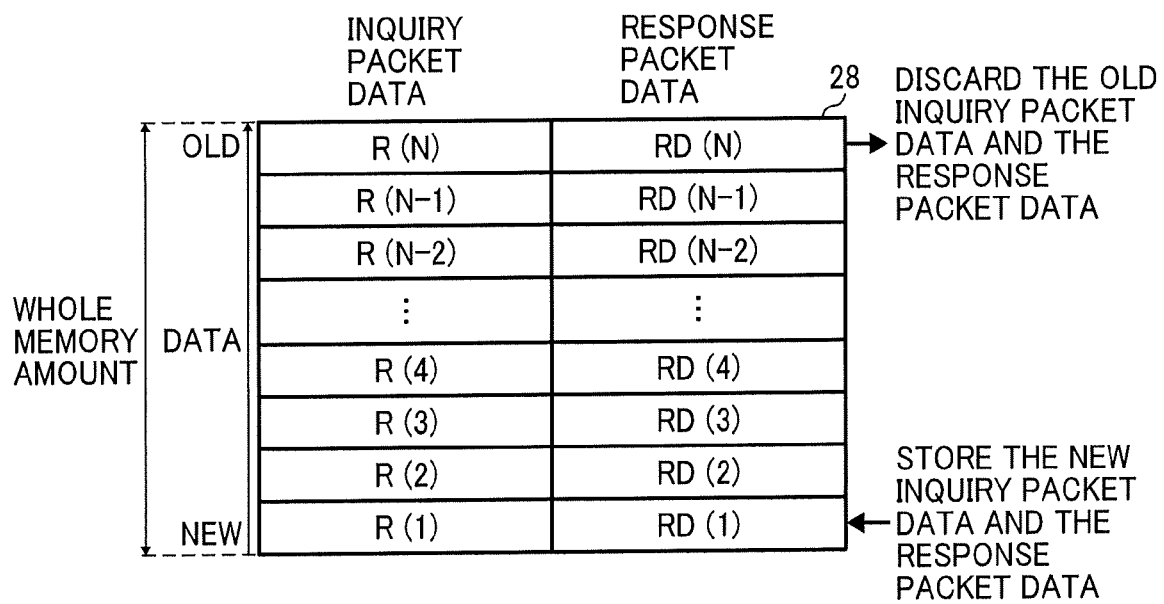
FIG. 5 is a memory map that indicates a structure of a storage area of a packet memory 28 shown in FIG. 4 according to one embodiment.

FIG. 5 is a memory map that indicates a structure of an area that stores the data of the packet memory 28 shown in FIG. 4. In FIG. 5, the packet memory includes areas R(1) to R(N) in which is stored the inquiry packet data, and areas RD(1) to RD(N) in which is stored the response packet data. The areas R(1) to R(N) and areas RD(1) to RD(N) are located so as to correspond to each other on a one-to-one basis.

As shown in FIG. 5, a method that exchanges data in this embodiment is a method for the changing new data and old data. In this method, the sub controller 20 stores a newly added inquiry packet data into the first area R(1), and stores response packet data to respond to the inquiry packet data into the first area RD(1). Next, when adding new inquiry packet data and response packet data, the sub controller 20 moves the previous inquiry packet data and response packet data stored in the 1st area of R (1) and RD (1) into the 2nd area of R (2) and RD (2). Further, the sub controller 20 moves newly added inquiry packet data and response data into the empty area of R (1) and RD (1). In this way, every time a newly added inquiry packet data and response packet data are generated, the sub controller 20 moves the old inquiry packet data and response packet data into the next area (upper area in FIG. 5) sequentially. In addition, the sub controller 20 stores the new inquiry packet data and the response packet data into the empty area of R (1) and RD (1) sequentially. After that, when the memory capacity of the packet memory 28 is filled, the sub controller 20 discards the oldest inquiry packet data and response packet data stored into the area of R (N) and RD (N), and moves the secondary old inquiry packet data and the response packet data into the next area sequentially. Thus, the sub controller 20 stores the newly added inquiry packet data and response packet data into the empty area of R (1) and RD (1) sequentially. According to this method, it is relatively easy to control the packet data changes because the sub controller 20 discards the old packet data simply.

FIG. 6 is a memory map that indicates an area structure that stores the data of the packet memory 28 related to a first modification of FIG. 5. In FIG. 6, the packet memory 28 includes 8 areas of R (1) to R(8) that store the inquiry packet data and 8 areas of RD(1) to RD(8) that store the response packet data. Also, the packet memory 28 includes 8 areas that store a number of times of response for the response packet data. The 8 areas of R (1) to R(8), the 8 areas of RD(1) to RD(8), and the 8 areas that store the number of times of response are located so as to be associated with each other.

As indicated in FIG. 6, the method of changing packet data in the first modification is a method of measuring a number of times of response of each response packet data, and replacing the packet data that has the smallest number of times of response with the new packet data. In particular, as in FIG. 5, the sub controller 20 stores the newly added inquiry packet data and response data into the packet memory sequentially every time that the newly added inquiry packet data and response data occurs. In addition, the sub controller 20 stores the number of times of response based on the response packet data stored in the packet memory 28. It should be noted that the number of times of response can be the number of times of response for the same inquiry packet data during a certain period of time, or the number of times of response after reset at a start up operation. After that, when the memory capacity of the packet memory 28 is filled, the sub controller 20 discards the inquiry packet data and the response packet data that was used the smallest number of times, and stores the newly added inquiry packet data and response packet data into the empty area. Here, the fact that the number of times of response are smaller, it is determined that the impact is small in maintaining the controller-off-energy-conservation mode (M3). For that reason, when the memory capacity is low, the method, which deletes the protocol data of the smallest number of times of response sequentially, is valuable in order to obtain the most energy-conserving effect.

FIG. 7 is a memory map that indicates an area structure that stores the data of the packet memory 28 related to a second modification of FIG. 5. The packet memory 28 of the second modification in FIG. 7 can store a reception time interval of the inquiry packet data instead of the number of times of response for the response packet data in the packet memory 28 of FIG. 6. Here, the reception time interval is, for example, a time interval between a current reception time and the last reception time.

As shown in FIG. 7, the method of changing packet data in the second modification is a method that measures a time interval between times of receiving an inquiry packet data determined by a same format protocol, and exchanges the packet data of the longest reception time interval with the new packet data. In particular, as in FIG. 5, the sub controller 20 stores the newly added inquiry packet data and response data into the packet memory sequentially every time that the newly added inquiry packet data and response data occurs. In addition, the sub controller 20 stores the time interval between receiving the inquiry packet data determined by the same format protocol. Further, the measurement of the reception time interval can be reset at start up. After that, when the memory capacity of the packet memory 28 is filled, the sub controller 20 discards the inquiry packet data and the response packet data corresponding to the longest reception time interval, and stores the newly added inquiry packet data and response packet data into the empty area. It should be noted that, if the reception time interval is shorter than a predetermined interval, it can be stored into the memory again. Here, the fact that the reception time interval that receives the packet data is longer, it is determined that the impact is small in maintaining the controller-off-energy-conservation mode (M3). For that reason, when the memory capacity is low, the method, which deletes the protocol data having the longest reception time interval sequentially, is valuable in order to obtain the most energy-conserving effect.

Figure 8B:
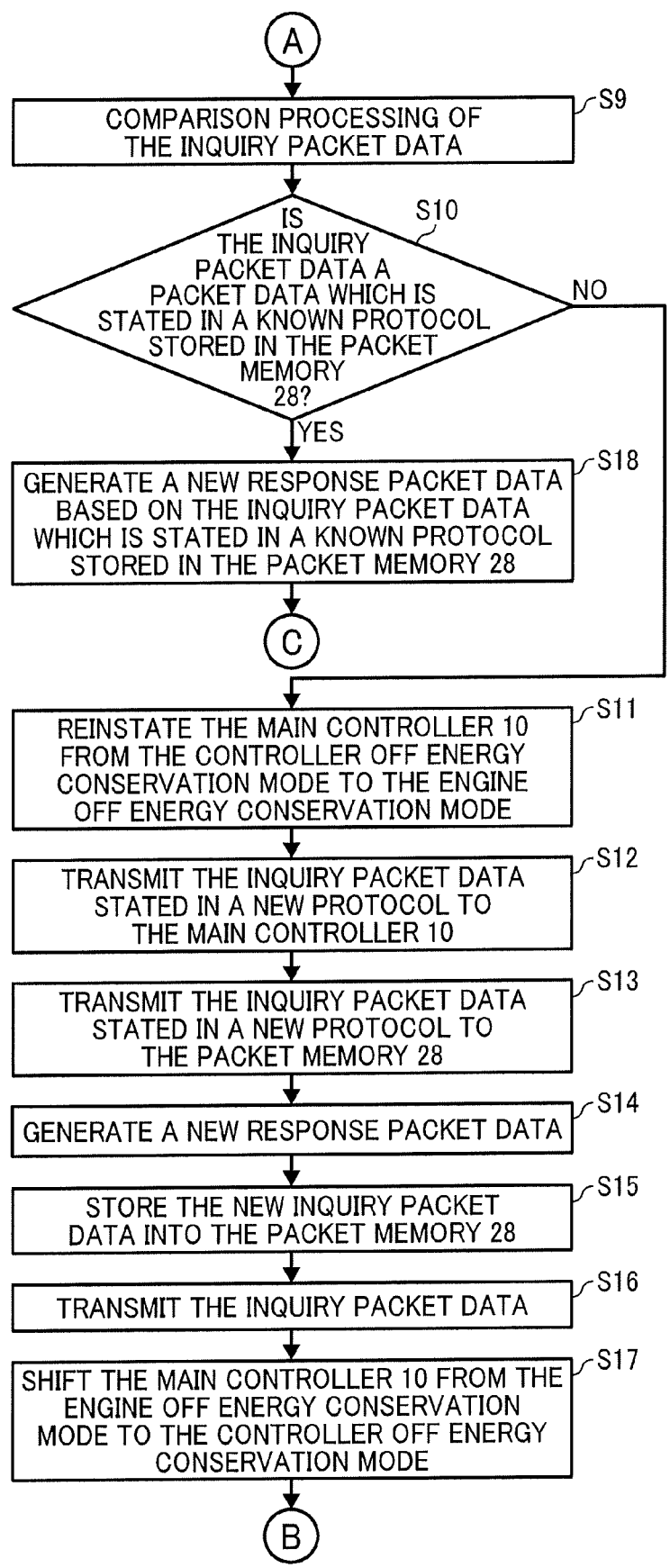
FIG. 8B is a flowchart of a second part of the network response processing shown in FIG. 8A according to one embodiment.

FIG. 8A and FIG. 8B are flowcharts that indicate network response processing in the controller-off-energy-conservation mode (M3) of the information processing device of FIG. 1.

In FIG. 8a, at first, the packet filter 27 determines whether inquiry packet data that needed to be responded to was received from the PC 3 via the LAN 2 and network I/F 24 (step S1). If the packet filter did not receive the inquiry packet data, the process returns to step S1.

When the packet filter received the inquiry packet data (at S1, YES), the packet filter 27 analyzes the received packet data (step S2). At first, the packet filter 27 determines whether or not the received inquiry packet data is addressed to itself (step S3). When the received inquiry packet data is not addressed to itself (at step S3, No), the packet filter 27 discards the packet data (step S4) and the process returns to step S1. On the other hand, when the received inquiry packet data is addressed to itself (at S3, Yes), the packet filter 27 determines whether or not the received inquiry packet data is stored in the memory 27m (step S5).

When the received inquiry packet data is an inquiry packet data stored in the memory 27m related to a part of expected status information (at step S5, Yes), the packet filter 27 generates new response packet data based on the inquiry packet data and the response packet data corresponding to the inquiry packet data that are stored in the memory 27m (step S6). Next, the packet filter 27 transmits the new response packet data to the PC 3 via the network I/F 24 and the LAN 2 (step S7). After that, the energy conservation control circuit 26 continues in the controller-off-energy-conservation mode (M3) (in FIG. 9, T33) (step 8), and the process returns to step S1.

On the other hand, at step S5 (at step S5, No), the packet filter determines whether the received inquiry packet data is an inquiry packet data that is unexpected status information not stored in the memory 27m, and the process moves to step S9 shown in FIG. 8B. Subsequently, the packet comparison circuit 29 performs comparison processing (step S9). The packet comparison circuit 29 compares the received inquiry packet data with the inquiry packet data stored in the packet memory 28. At this time, the packet comparison circuit 29 determines whether the received packet data is the packet data determined by expected known network protocols stored in the packet memory 28 (step S10).

When the determination is NO in step S10, the process proceeds to step S11. When the received packet data is packet data corresponding to a new network protocol not stored in the packet memory 28, at first, the energy conservation control circuit 26 reinstates the main controller 10 by controlling the power supply circuit 18. That is, the energy conservation control circuit 26 transfers from the controller-off-energy-conservation mode (M3) to the engine-off-energy-conservation mode (M2) (In FIG. 9, T32) (step S11).

Next, the CPU 21 transmits the inquiry packet data determined by the new network protocols to the main controller 10 (step S12), and stores the inquiry packet data into the packet memory 28 (step S13). Next, the CPU 11 generates a response packet data so as to respond to the inquiry packet data determined by the new network protocols, and transmit it to the CPU 21 (step S14). Next, the CPU 21 stores the response packet data generated by the CPU 11 into the memory 28 (step S15). Also, the CPU 21 transmits the response packet data generated by the CPU 11 to the PC3 via the network I/F 24 and the LAN 2 (step S16). Next, the energy conservation control circuit 26 transfers the main controller 10 from the engine-off-energy-conservation mode (M2) to the controller-off-energy-conservation mode (M3) (in FIG. 9, T23) (step S17), and the process proceeds to step S1 shown in FIG. 8A.

On the other hand, when the determination is YES in step S10, that is, the received inquiry packet data is the inquiry packet data determined by expected known network protocols, which is stored in the packet memory 28, the CPU 21 generates response packet data. At this time, the CPU 21 generates new response packet data based on the inquiry packet data and the response packet data corresponding to the inquiry packet data, which are stored in the packet memory 28 (step S18), and the process proceeds to step S7 shown in FIG. 8A. The CPU 21 transmits the generated new response packet data to the PC 3 via the network I/F 24 and the LAN 2 (step S7). After that, the energy conservation control circuit 26 continues the controller-off-energy-conservation mode (M3) (in FIG. 9 T33) (step 8), and the process returns to step S1.

According to one embodiment of the information processing device 1, the sub controller 20 has the packet memory 28 and the packet comparison circuit 29. The sub controller 29 stores the response packet data generated by the main controller 10 into the packet memory 28 in association with the inquiry packet data (FIGS. 5-7). When the received inquiry packet data is consistent with the inquiry packet data stored in the packet memory 28, the packet comparison circuit 29 generates the response packet data based on the response packet data stored in the packet memory 28 (FIG. 8B). Thus, when the sub controller 20 receives inquiry packet data determined by unexpected new network protocols for the first time in the controller-off-energy-conservation mode (M3), the sub controller 20 reinstates the main controller 10. That is, the sub controller 20 reinstates the information processing device from the controller-off-energy-conservation mode (M3) to the engine-off-energy-conservation mode (M2) (FIG. 8B, the same as FIG. 9: T32). On the other hand, when the sub controller 20 receives the inquiry packet data determined by unexpected new network protocols, the sub controller 20 can respond. For this reason, the main controller 10 is able to maintain the controller-off-energy-conservation mode (M3) (FIG. 8B, the same as FIG. 9: T32). Therefore, the energy consumption is reduced when the information processing device receives the inquiry packet data determined by the unexpected new network protocols in the energy conservation mode.

In this way, it is possible to add the inquiry packet data corresponding to the new network protocols and the response packet data into the packet memory 28 sequentially. Thus, there is no need to prepare the inquiry packet data determined by the new network protocols, and incorporate the response packet data into the sub controller 20 ahead of time. Also, there is no need to implement the mechanism to existing equipment on the market already, and it is possible to provide the convenience of energy conservation to the user.

Further, in one embodiment, data can be moved between the packet memory 28 and the memory 27m. For example, the frequency of propagating through the network environment of the inquiry packet data related to an expected status information first in the memory 27m, can be reduced due to changes in the network environment. For example, when the response frequency (or response time interval) of data stored in the packet memory 28 is relatively more (less) than the response frequency or response time interval of a data stored in the packet memory 27m, the data stored in the packet memory 28 can be moved to the memory 27m. Thus, for example, it is possible to eliminate the determining steps of step S9 and step S10, etc. in FIG. 8B, and it is possible to shorten the response performance to the inquiry packet data corresponding to this data.

On the contrary, for example, the frequency of propagating through the network environment of the inquiry packet data determined by unexpected new network protocols stored in the packet memory 28 can increase due to changes in the network environment. For example, when the response frequency (or response time interval) of data stored in the packet memory 28 is relatively more (less) than the response frequency or response time interval of a data stored in the packet memory 27m, the data stored in the packet memory 27m can be moved to the memory 28. By this, it is possible to prevent an increase in capacity of the memory 27m, and it is possible to prevent an increase in cost and power consumption due to the memory.

Further, the data in the memory 28 and the memory 27m can be interchanged. Thus, while improving the response performance to the inquiry packet corresponding to the data moved to the memory 27m, it is possible to prevent an increase in the memory capacity.

It should be noted that, the present disclosure can be variously modified without being limited to the embodiments described above. For example, inquiry packet data can be moved to the packet memory 28 before it is expected to be required for the network protocols before transition from the engine-off-energy-conservation mode (M2) to the controller-off-energy-conservation mode (M3). For example, it is assumed that inquiry packet data determined by a protocol, which requests status information such as the SNMP (Simple Network Management Protocol) etc. is stored in the packet memory 28. In this case, the CPU 21 obtains response packet data of the newest status information from the main controller 10, and stores the response packet data into the memory 28. By this, it is able to transmit the response packet data of the latest status information for the inquiry packet data from a client terminal device, when the main controller 10 transitions from the engine-off-energy-conservation mode (M2) to the controller-off-energy-conservation mode (M3). This is valid for the case that the device status does not change in the controller-off-energy-conservation mode (M3).

Further, the information processing device 1 is not limited to the above description. For example, in addition, the information processing device 1 can be an MFP (Multi-Functional Peripheral) that includes a facsimile function, etc.

Further, a data processing apparatus 1 is described in the present disclosure, such as a MFP. However, the present disclosure is not limited thereto. The present disclosure can include a variety of information processing devices of the network device or the like connected to a network, such as a printer, a scanner, a router, a Blu-ray recorders, a server device, a projector, or a network camera, which comprise a power conservation mode.

Further, in the information processing device related to the present disclosure, the subject connected via the information processing device 1 and the LAN 2 is not limited to the PC 3, the tablet terminal device 4, and the mobile phone 5.

The invention claimed is:

1. An information processing device connected to a terminal via a network, the information processing device comprising:
   a packet memory that stores inquiry packet data received from the terminal in association with response packet data to respond to the inquiry packet data;
   control circuitry configured to control an operation mode of the information processing device, wherein
   when the information processing device is in an energy conservation mode, the control circuitry is configured to determine whether or not the received inquiry packet data is new inquiry packet data determined by new network protocols, when the received inquiry packet data is the new inquiry packet data, the control circuitry is configured to reinstate the information processing device, in conjunction with a transmission for the response packet data generated by the information processing device to the terminal, and store the received inquiry packet data and the generated response packet data to the packet memory, when the received inquiry packet data is not the new inquiry packet data, the control circuitry is configured to generate new response packet data based on the response packet data stored in the packet memory, and transmit the new response packet data to the terminal, and when memory capacity of the packet memory is full, the control circuitry is further configured to discard inquiry packet data and response packet data, and store the received inquiry packet data and the generated packet data into the packet memory.

2. The information processing device according to claim 1, wherein the control circuitry is further configured to store the received inquiry packet data, the new response packet data corresponding to the inquiry packet data, and a number of transmission times for a response of the new response packet data in association with each other in the packet memory, and discard one inquiry packet data and a corresponding response packet data stored in the packet memory based on the number of response times.

3. The information processing device according to claim 1, wherein the control circuitry is further configured to store the received inquiry packet data, the new response packet data corresponding to the inquiry packet data, and a reception time interval that receives a same kind of the inquiry packet data in association with each other into the packet memory, and the control circuitry is further configured to discard one inquiry packet data and the response packet data stored in the packet memory based on the reception time interval.

4. The information processing device according to claim 1, wherein before the information processing device acts in the energy conservation mode, the control circuitry is configured to store, into the packet memory, inquiry packet data determined by an expected status information in association with response packet data to respond to the inquiry packet data.

5. An information processing system, comprising:
a network;
a terminal connected with the network; and
the information processing device according to claim 1, wherein the information processing system is connected with the terminal via the network.

6. An information processing device connected to a terminal via a network, the information processing device comprising:
a packet memory that stores inquiry packet data received from the terminal in association with response packet data to respond to the inquiry packet data;
control circuitry configured to control an operation mode of the information processing device, wherein
when the information processing device is in an energy conservation mode, the control circuitry is configured to determine whether or not the received inquiry packet data is new inquiry packet data determined by new network protocols, when the received inquiry packet data is the new inquiry packet data, the control circuitry is configured to reinstate the information processing device, in conjunction with a transmission for the response packet data generated by the information processing device to the terminal, and store the received inquiry packet data and the generated response packet data to the packet memory, when the received inquiry packet data is not the new inquiry packet data, the control circuitry is configured to generate new response packet data based on the response packet data stored in the packet memory, and transmit the new response packet data to the terminal, and wherein the control circuitry is further configured to discard the inquiry packet data and the response packet data corresponding to a smallest response number from the packet memory.

7. An information processing device connected to a terminal via a network, the information processing device comprising:
a packet memory that stores inquiry packet data received from the terminal in association with response packet data to respond to the inquiry packet data;
control circuitry configured to control an operation mode of the information processing device, wherein
when the information processing device is in an energy conservation mode, the control circuitry is configured to determine whether or not the received inquiry packet data is new inquiry packet data determined by new network protocols, when the received inquiry packet data is the new inquiry packet data, the control circuitry is configured to reinstate the information processing device, in conjunction with a transmission for the response packet data generated by the information processing device to the terminal, and store the received inquiry packet data and the generated response packet data to the packet memory, when the received inquiry packet data is not the new inquiry packet data, the control circuitry is configured to generate new response packet data based on the response packet data stored in the packet memory, and transmit the new response packet data to the terminal, and wherein the control circuitry is further configured to discard the inquiry packet data and the response packet data corresponding to a longest reception time interval from the packet memory.

8. An information processing method in an information processing device connected with a terminal via a network, the information processing device including a packet memory that stores inquiry packet data received from the terminal device and response packet data to response to the inquiry packet data in association with the inquiry packet data, and control circuitry that controls an operation mode of the information processing device, when the information processing device is acting in an energy conservation mode, the information processing method comprising:
determining whether the received inquiry packet data is a new inquiry packet data determined by new network protocols;
storing the received inquiry packet data and response packet data to the packet memory, and reinstating the information processing device in conjunction with a transmission for the response packet data generated by the information processing device to the terminal, when the received inquiry packet data is the new inquiry packet data; and transmitting new response packet data generated based on the response packet data stored in the packet memory to the terminal, when the received inquiry packet data is not the new inquiry packet data, wherein the method further includes discarding inquiry packet data and response packet data, and storing the received inquiry packet data and the generated packet data into the packet memory, when memory capacity of the packet memory is full.

9. The information processing method according to claim 8, further comprising:

storing the received inquiry packet data, the new response packet data corresponding to the inquiry packet data, and a number of transmission times for a response of the new response packet data in association with each other in the packet memory, and discarding one inquiry packet data and a corresponding response packet data stored in the packet memory based on the number of response times.

10. The information processing method according to claim 8, further comprising storing the received inquiry packet data, the new response packet data corresponding to the inquiry packet data, and a reception time interval that receives a same kind of the inquiry packet data in association with each other into the packet memory, and discarding one inquiry packet data and the response packet data stored in the packet memory based on the reception time interval.

11. The information processing method according to claim 8, further comprising storing, in the packet memory, inquiry packet data determined by an expected status information in association with response packet data to respond to the inquiry packet data, before the information processing device acts in the energy conservation mode.

12. An information processing method in an information processing device connected with a terminal via a network, the information processing device including a packet memory that stores inquiry packet data received from the terminal device and response packet data to response to the inquiry packet data in association with the inquiry packet data, and control circuitry that controls an operation mode of the information processing device, when the information processing device is acting in an energy conservation mode, the information processing method comprising:

determining whether the received inquiry packet data is a new inquiry packet data determined by new network protocols;

storing the received inquiry packet data and response packet data to the packet memory, and reinstating the information processing device in conjunction with a transmission for the response packet data generated by the information processing device to the terminal, when the received inquiry packet data is the new inquiry packet data; and transmitting new response packet data generated based on the response packet data stored in the packet memory to the terminal, when the received inquiry packet data is not the new inquiry packet data, wherein the method further includes discarding the inquiry packet data and the response packet data corresponding to a smallest response number from the packet memory.

13. An information processing method in an information processing device connected with a terminal via a network, the information processing device including a packet memory that stores inquiry packet data received from the terminal device and response packet data to response to the inquiry packet data in association with the inquiry packet data, and control circuitry that controls an operation mode of the information processing device, when the information processing device is acting in an energy conservation mode, the information processing method comprising:

determining whether the received inquiry packet data is a new inquiry packet data determined by new network protocols;

storing the received inquiry packet data and response packet data to the packet memory, and reinstating the information processing device in conjunction with a transmission for the response packet data generated by the information processing device to the terminal, when the received inquiry packet data is the new inquiry packet data; and transmitting new response packet data generated based on the response packet data stored in the packet memory to the terminal, when the received inquiry packet data is not the new inquiry packet data, wherein the method further includes discarding the inquiry packet data and the response packet data corresponding to a longest reception time interval from the packet memory.

14. A non-transitory computer-readable medium storing a program, which when executed by control circuitry of an information processing device connected with a terminal via a network, the information processing device including a packet memory that stores inquiry packet data received from the terminal device and response packet data to response to the inquiry packet data in association with the inquiry packet data, and the control circuitry, which controls an operation mode of the information processing device, when the information processing device is acting in an energy conservation mode, causes the information processing device to perform a method comprising:

determining whether the received inquiry packet data is a new inquiry packet data determined by new network protocols;

storing the received inquiry packet data and response packet data to the packet memory, and reinstating the information processing device in conjunction with a transmission for the response packet data generated by the information processing device to the terminal, when the received inquiry packet data is the new inquiry packet data; and transmitting new response packet data generated based on the response packet data stored in the packet memory to the terminal, when the received inquiry packet data is not the new inquiry packet data, wherein the method further includes discarding inquiry packet data and response packet data, and storing the received inquiry packet data and the generated packet data into the packet memory, when memory capacity of the packet memory is full.

15. The non-transitory computer-readable medium according to claim 14, wherein the method further comprises:

storing the received inquiry packet data, the new response packet data corresponding to the inquiry packet data, and a number of transmission times for a response of the new response packet data in association with each other in the packet memory, and discarding one inquiry packet data and a corresponding response packet data stored in the packet memory based on the number of response times.

16. The non-transitory computer-readable medium according to claim 14, wherein the method further comprises discarding the inquiry packet data and the response packet data corresponding to a smallest response number from the packet memory.

17. The non-transitory computer-readable medium according to claim 14, wherein the method further comprises storing the received inquiry packet data, the new response packet data corresponding to the inquiry packet data, and a reception time interval that receives a same kind of the inquiry packet data in association with each other into the packet memory, and discarding one inquiry packet data and the response packet data stored in the packet memory based on the reception time interval.

* * * * *